US008840155B2

(12) United States Patent
Morita

(10) Patent No.: US 8,840,155 B2
(45) Date of Patent: Sep. 23, 2014

(54) ANNULAR SEAL ASSEMBLING JIG

(71) Applicants: Honda Sun Co,., Ltd., Oita (JP); Honda Motor Co., Ltd., Tokyo (JP)

(72) Inventor: Shogo Morita, Oita (JP)

(73) Assignees: Honda Motor Co., Ltd., Tokyo (JP); Honda Sun Co., Ltd., Hayami-Gun (JP)

( * ) Notice: Subject to any disclaimer, the term of this patent is extended or adjusted under 35 U.S.C. 154(b) by 0 days.

(21) Appl. No.: 13/778,842

(22) Filed: Feb. 27, 2013

(65) Prior Publication Data

US 2013/0298390 A1 Nov. 14, 2013

(30) Foreign Application Priority Data

May 8, 2012 (JP) .................................. 2012-107016

(51) Int. Cl.
*B25B 27/00* (2006.01)
*B23P 19/08* (2006.01)
*B23P 19/04* (2006.01)

(52) U.S. Cl.
CPC ............... *B23P 19/04* (2013.01); *B23P 19/084* (2013.01)
USPC ............................................ 292/235; 29/278

(58) Field of Classification Search
USPC .......................... 269/43, 45, 266, 271, 289 R
See application file for complete search history.

(56) References Cited

U.S. PATENT DOCUMENTS

| 4,074,422 | A | * | 2/1978 | Borjesson et al. | ............... 29/730 |
| 4,821,393 | A | * | 4/1989 | Spigarelli | ........................ 29/283 |
| 4,874,156 | A | * | 10/1989 | Goldzweig | .................... 269/158 |
| 5,052,092 | A | * | 10/1991 | Vallauri et al. | ................... 29/234 |
| 5,387,287 | A | * | 2/1995 | Reiter et al. | ................... 118/503 |
| 5,975,511 | A | * | 11/1999 | Bohler | ............................ 269/43 |
| 8,066,270 | B2 | * | 11/2011 | Siegel | .......................... 269/279 |

FOREIGN PATENT DOCUMENTS

JP 2005-053443 3/2005

* cited by examiner

*Primary Examiner* — Lee D Wilson
(74) *Attorney, Agent, or Firm* — Rankin, Hill & Clark LLP

(57) ABSTRACT

An annular seal assembling jig 1 is used when assembling an annular seal 3 to a spherical body 2 of a ball joint. The jig 1 is equipped with a plurality of split tables 7 which constitutes one table 6, a slider 5 fixed to the split table 7 and is capable of sliding freely along a guide rail 5*a*, a coil spring 82 which biases the slider 5 to the other split table 7 side, and a claw portion 72*a* provided to each split table 7, so as to catch the annular seal 3 placed on the table 6, from an inner side of the annular seal 3.

3 Claims, 4 Drawing Sheets

US 8,840,155 B2

ANNULAR SEAL ASSEMBLING JIG

BACKGROUND OF THE INVENTION

1. Field of the Invention

The present invention relates to a jig used when assembling an annular seal to a spherical body of a ball joint, the ball joint including the spherical body and a spherical concave portion for receiving the spherical body.

2. Description of the Related Art

Conventionally, a link mechanism to be provided in a windshield wiper and the like is known (for example, refer to Japanese Patent Laid-Open No. 2005-53443).

This link mechanism is equipped with a ball joint, including a spherical body and a spherical concave portion for receiving the spherical body. Further, in order to prevent water or dirt from entering between the spherical body and the spherical concave portion from outside, and to prevent the generation of contamination and rust between the spherical body and the spherical concave portion, an annular seal is assembled to the spherical body.

Conventionally, the annular seal had been manually assembled to the spherical body. However, the annular seal is comparatively hard, and it is difficult to assemble the same to the spherical body. Further, when assembling the annual seal if the annular seal is stretched too widely, there is a fear that the annular seal may be ruptured.

SUMMARY OF THE INVENTION

In view of the above-mentioned points, an object of the present invention is to provide a jig capable of easily assembling the annular seal to the spherical body.

In order to achieve the object mentioned above, the present invention provides an annular seal assembling jig used when assembling an annular seal to a spherical body of a ball joint, including: a plurality of split tables which constitute one table capable of placing the annular seal thereon; a slider which is fixed to the split table, and which is capable of sliding freely along a guide rail; a biasing unit which biases the slider towards the other split table side; and a claw portion which is provided to each split table, so as to catch the annular seal placed on the table, from an inner side of the annular seal, wherein, by pressing the spherical body to the claw portion from above, the slider moves along the guide rail in a direction of departing the split tables from each other, the annular seal is stretched by the claw portion, and the annular seal is assembled to the spherical body.

According to the present invention, it becomes possible to easily assemble the annular seal to the spherical body, just by pressing the spherical body to the claw portion from above. Further, unlike in the case of manual operation, the annular seal will not be stretched more than necessary, so that it becomes possible to prevent rupture of the annual seal. By doing so, yield of the assembling operation of the annual seal is improved.

In the present invention, preferably, the claw portion is formed in a cross-sectionally arc-shape. With such configuration, it becomes easier to receive the spherical body by the arc-shaped leading end of the claw portion. Further, it becomes easier to pull out the annular seal together with the spherical body from the jig.

DESCRIPTION OF THE PREFERRED EMBODIMENTS

Figure 1:
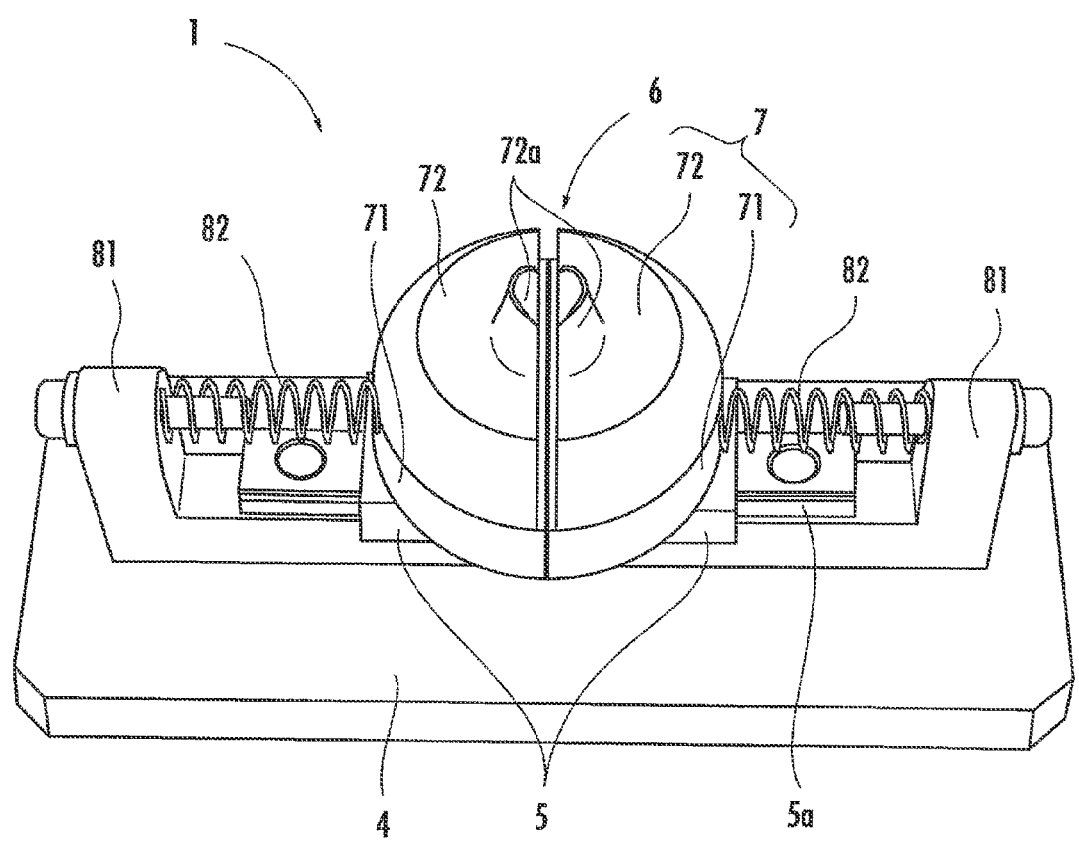
FIG. 1 is an explanatory view of an embodiment of an annular seal assembling jig of the present invention.

An embodiment of an annular seal assembling jig of the present invention will now be explained with reference to FIG. 1 through FIG. 4. An annular seal assembling jig 1 of the present embodiment is used when assembling an annular seal 3 to a spherical body 2 of a ball joint, the ball joint being provided to a link mechanism equipped with a pivot assembly of a windshield wiper link and the like. The annular seal assembling jig 1 is equipped with a base 4, a guide rail 5a arranged on the base 4, and two sliders 5, 5 that are capable of sliding freely along the guide rail 5a.

Each slider 5 is fixed with a semicircular split table 7. By abutting the two semicircular split tables 7, a disk-shaped table 6 is formed, and one annular seal 3 may be placed on the table 6.

Each split table 7 is configured from a semicircular lower portion 71 fixed to the slider 5, and a semicircular upper portion 72 fixed to an upper surface of the lower body 71. The upper portion 72 is configured from a synthetic resin having small coefficient of friction. Further, the lower portion 71 is configured from the same metal as the base 4. The lower portion 71 is fixed to the slider 5 so as to come closer between the split tables 7 than the upper portion 72. Therefore, when the split tables 7 abut against each other, and the disk-shaped table 6 is formed, the lower portions 71 abut against each other, and a gap is formed between the upper portions 72.

To an upper surface of each split table 7, a claw portion 72a projecting upward is formed, at a position on the side where the split table 7 abuts. The claw portion 72a is formed in a cross-sectionally arc-shape, so as to match an inner circumferential surface of the annular seal 3.

Further, on the base 4, a pair of column portions 81, 81 is formed so as to be positioned at both end sides of the guide rail 5a. A coil spring 82 as a biasing unit for biasing the table 6 in a direction of coming closer to each other, is provided between the column portion 81 and the table 6. Elastic coefficients of both coil springs 82 are set to be the same. By doing so, it becomes possible to position both sliders 5 at the center, without being unbalanced to one side.

Figure 2:
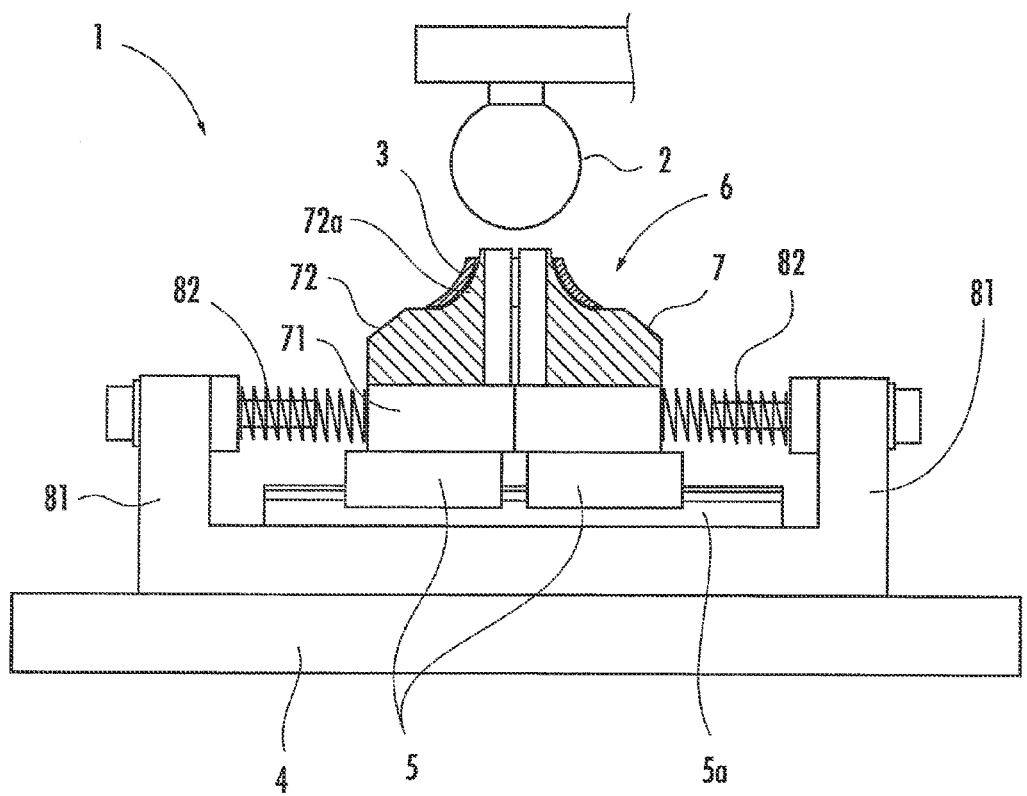
FIG. 2 is an explanatory view showing the annular seal assembling jig of the present invention partly in section.

Next, an explanation will be given on the method for assembling the annular seal 3 to the spherical body 2 of the ball joint. First, as is shown in FIG. 2, the annular seal 3 is placed on the table 6. At this time, the claw portion 72a is inserted into the annular seal 3.

Figure 3:
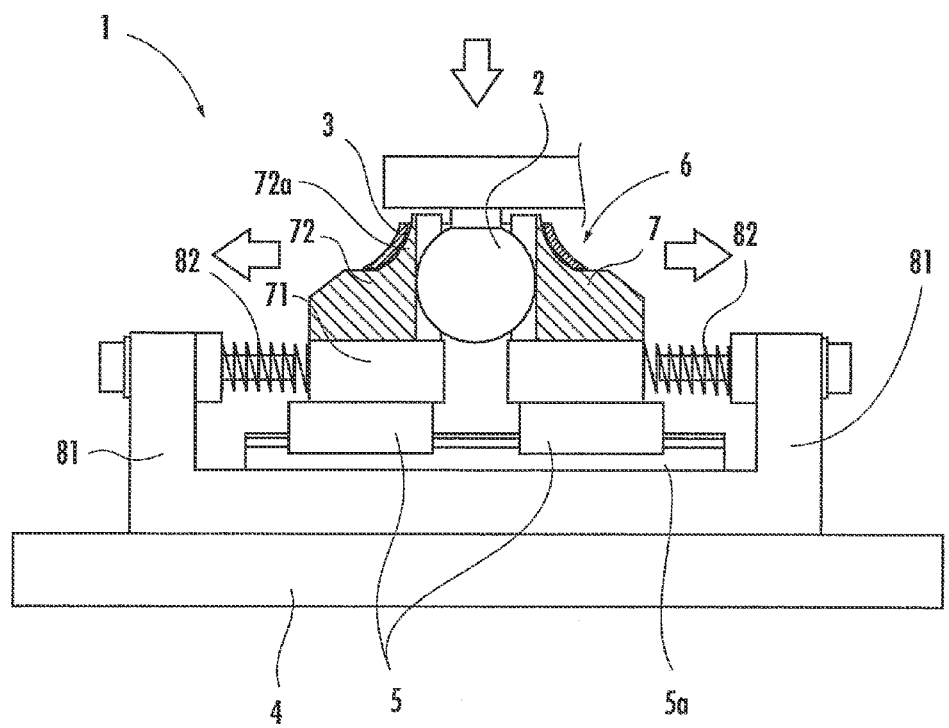
FIG. 3 is an explanatory view showing a usage of the annular seal assembling jig of the present invention.

Further, the claw portion 72a is configured so that an upper end thereof is positioned upward than the annular seal 3 placed on the table 6. Further, as is shown in FIG. 3, the spherical body 2 is pressed downward so as to abut to the upper end of the claw portion 72a from above. Accompanying the descending of the spherical body 2, the upper end of the claw portion 72a slides on the surface of the spherical body 2, and the sliders 5 are pushed opened along the guide rail 5a.

By doing so, both split tables 7 are departed from one another, and the annular seal 3 is extended from inner side thereof by side surfaces of the claw portions 72a. At this time, the spherical body 2 is inserted into the annular seal 3.

Figure 4:
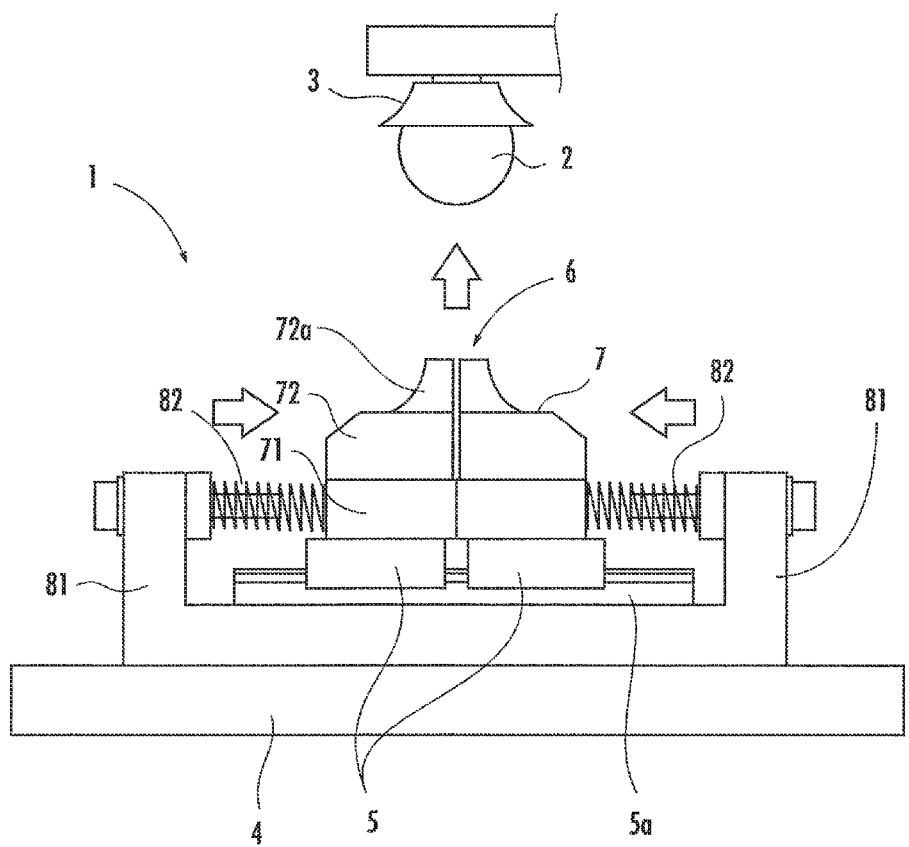
FIG. 4 is an explanatory view showing a state where the annular seal is assembled by the annual seal assembling jig of the present embodiment.

Thereafter, as is shown in FIG. 4, when the spherical body 2 is pulled out, a portion of the annular seal 3 positioned in a direction orthogonal to the sliding direction of the slider 5 (a vertical direction to the plane of paper in FIGS. 1 through 3) becomes caught by the spherical body 2, so that the annular seal 3 is pulled out therewith. Thereby, the assembling of the annular seal 3 to the spherical body 2 is complete.

According to the annular seal assembling jig 1 of the present embodiment, the annular seal 3 may be easily assembled by pressing the spherical body 2 to the annular seal 3. Further, compared to the case of assembling the same manually, it becomes possible to prevent extending the annular seal 3 more than necessary, and to prevent rupture of the annular seal 3.

In the present embodiment, the one in which the slider 5 is provided to each of the two split tables 7 had been explained. However, the configuration of the present invention is not limited thereto, and for example, a slider may only be provided to one of the split tables, and the other split table may be fixed to the base.

In this case, when the spherical body is pressed against the jig, the spherical body moves diagonally along with the movement of the slider, so that assembling becomes slightly difficult than in the case of the present embodiment. However, the mounting operation becomes easier compared to the case of assembling the annular seal manually.

Further, in the present embodiment, two split tables 7 and two sliders 5 are provided. However, the present invention is not limited thereto, and three or more of the split tables and the sliders may be provided. In this case, a plurality of guide rails must be provided to comply with the sliders.

What is claimed is:

1. An annular seal assembling jig used when assembling an annular seal to a spherical body of a ball joint, comprising:
    a plurality of split tables which constitute one table capable of placing the annular seal thereon;
    a slider which is fixed to one of the plurality of split tables, and which is capable of sliding freely along a guide rail;
    a biasing unit which biases the slider along the guide rail in a direction so that the split tables approach one another; and
    a claw portion which is provided to each split table, so as to catch the annular seal placed on the table, from an inner side of the annular seal,
    wherein, by pressing the spherical body to the claw portion from above, the slider moves along the guide rail in a direction of departing the split tables from each other, the annular seal is stretched by the claw portion, and the annular seal is assembled to the spherical body, and
    wherein an upper edge portion of each of the claw portions is formed in an arc shape, and the upper edge portions of the claw portions of the plurality of split tables form a substantially circular shape when the plurality of split tables are brought into abutment by the biasing unit.

2. The annular seal assembling jig according to claim 1, wherein the claw portion is formed in a cross-sectionally arc-shape.

3. The annular seal assembling jig according to claim 1, wherein the plurality of split tables mutually face each other at one side that is opposite to another side where the biasing unit is provided.

* * * * *